United States Patent [19]

Yazawa et al.

[11] 4,076,782
[45] Feb. 28, 1978

[54] SUPPLYING METHOD FOR PRELIMINARILY EXPANDED POLYSTYRENE BEADS IN A THIN AND UNIFORM LAYER

[75] Inventors: Masahide Yazawa; Teruo Kubo; Kunio Suzuki, all of Tokyo, Japan

[73] Assignee: Polymer Processing Research Institute Ltd, Tokyo, Japan

[21] Appl. No.: 658,659

[22] Filed: Feb. 17, 1976

Related U.S. Application Data

[63] Continuation of Ser. No. 503,825, Sep. 6, 1974, abandoned.

[30] Foreign Application Priority Data

Sep. 7, 1973   Japan ..................................48-100860

[51] Int. Cl.² ............................................. B29D 27/00
[52] U.S. Cl. ..................................... 264/51; 264/230; 264/288; 264/DIG. 4; 264/DIG. 10; 264/DIG. 71
[58] Field of Search ..................... 264/51, 53, DIG. 4, 264/48, 237, 46.2, 46.3, 45.8, 230, DIG. 71, 288, DIG. 10

[56] References Cited

U.S. PATENT DOCUMENTS

| | | | |
|---|---|---|---|
| 2,813,053 | 11/1957 | Tuomala | 264/DIG. 4 |
| 3,037,897 | 6/1962 | Pelley | 264/46.2 X |
| 3,082,483 | 3/1963 | Bickford | 264/DIG. 4 |
| 3,119,147 | 1/1964 | Kracht | 264/DIG. 4 |
| 3,159,700 | 12/1964 | Nakamura | 264/DIG. 4 |
| 3,200,437 | 8/1965 | Sasanko | 264/DIG. 4 |
| 3,364,519 | 1/1968 | Pitsch | 264/48 X |
| 3,459,274 | 8/1969 | MacPhail | 264/DIG. 4 |
| 3,885,009 | 5/1975 | Rivat-Lahousse | 264/53 X |
| 3,971,838 | 7/1976 | Yazawa | 264/237 X |

Primary Examiner—Philip Anderson
Attorney, Agent, or Firm—Fred Philpitt

[57] ABSTRACT

In the process where a shaped product of expanded polystyrene is continuously produced by passing preliminarily expanded beads of polystyrene interposed inside a carrying means comprising a circulating steam-permeable single belt or a set of belts of the same nature through a pressurized steam chamber provided with pressure-sealing means at the inlet and the outlet thereof, thereby closely integrating the beads into a sheet through softening and expansion of the beads by steam heating, then cooling the resulting shaped product, and separating the shaped product from the carrying belt or belts, while withdrawing the shaped product to a successive step and returning the carrying belt or belts to the inlet side of the pressurized steam chamber, at least one of the surfaces of the carrying belt(s) is wetted with water before supplying the preliminarily expanded beads onto the belt(s) on the inlet side of the pressurized steam chamber, and thereafter the preliminarily expanded beads are supplied in excess onto the wetted surface(s) of the belt(s), the beads free from the adhering action due to the surface tension of water on the surface(s) of the belt(s) are removed from the belt(s), and the remaining beads attached to the wet belt(s) are fed into the pressurized steam chamber, while being interposed between the belts.

3 Claims, 5 Drawing Figures

SUPPLYING METHOD FOR PRELIMINARILY EXPANDED POLYSTYRENE BEADS IN A THIN AND UNIFORM LAYER

This is a continuation of application Ser. No. 503,825, filed Sept. 6, 1974, and now abandoned.

DESCRIPTION OF THE INVENTION

This invention relates to a method for continuously producing a thin, light, especially soft, expanded sheet of polystyrene having, for example, a thickness of 0.5 to 5 mm and a weight per unit area of 20 to 60 g/m² from preliminarily expanded beads of polystyrene as raw material, by enveloping the beads inside a steam-permeable carrying belt or between such belts, circulating through the course of a pressurized steam process, in which method the beads are enveloped in a uniform thickness on the inlet-side of a pressurized steam chamber.

The present inventors previously disclosed in another prior invention a method for continuously producing a shaped expanded product by pressurized steam process, comprising passing preliminarily expanded beads of polystyrene interposed inside a carrying means comprising steam-permeable circulating belt or belts through a pressurized steam chamber provided with means capable of effecting pressure sealing at the inlet and the outlet of the chamber to keep a desired pressure therein, thereby reexpanding the preliminarily expanded beads in a softened state while heated, and closely integrating the beads into a continuous shaped sheet product, then after cooling, separating the shaped sheet product from the carrying means, while withdrawing the shaped sheet product to a successive step, and returning the carrying means to the inlet-side of the chamber, and repeating the operation of interposing the raw beads freshly into the carrying means.

In the prior invention, the preliminarily expanded beads are supplied onto a circulating carrying means, i.e. belt or belts, (1) by depositing the pneumatically conveyed, preliminarily expanded beads onto walls of the inside cavity of the carrying means passing through a suction chamber provided with perforated walls, while running the circulating carrying means in contact with and along the perforated walls of the suction chamber, thereby retaining the beads in the cavity of the carrying means, to obtain a shaped sheet product having a relatively large thickness, or (2) by filling up recesses regularly arranged on a rotating roller with the preliminarily expanded beads in the thickness of one single layer of the beads, transferring the beads from the recesses to one surface of the travelling carrying belt, thereby interposing the beads between the carrying means, when a shaped sheet product having a relatively small thickness is to be obtained.

However, in said second procedure (2), the preliminarily expanded beads filled up in the recesses are sometimes hard to be released from the recesses, due to the retained elasticity of the beads, even though they are satisfactorily filled up. Therefore, there still remains such a problem as mentioned above to be solved in the prior invention.

The present invention provides a new method for supplying the raw beads to the carrying belt or belts suitable for producing a particularly thin expanded sheet in connection with said prior invention. That is to say, the present invention provides a new method for supplying the beads in the thickness of one single layer of the beads, that is, in a thin and uniform thickness with much simplicity and exactness, to one side of the circulating belt wetted with water, such as wet cloth belt, by utilizing the surface tension of water on the wet belt.

The present invention resorts, in the method for continuously producing a shaped product of expanded polystyrene comprising passing preliminarily expanded beads of polystyrene interposed inside a carrying means comprising at least one circulating steam-permeable belt through a pressurized steam chamber provided with pressure-sealing means both at the inlet and the outlet thereof, thereby closely integrating the beads into a sheet through softening and expansion of the beads by steam heating, then cooling the resulting shaped product, and separating the shaped product from the carrying means while withdrawing the shaped product to a successive step in the open atmosphere and returning the carrying means to the inlet-side of the pressurized steam chamber, to an improvement in feeding the preliminarily expanded beads to the carrying means, which comprises wetting at least one surface of at least one circulating belt as the carrying means with water before feeding the preliminarily expanded beads thereto on the inlet-side of the pressurized steam chamber, then feeding the beads in excess onto the wetted surface of the belt, removing therefrom the beads free from the adhering action due to the surface tension of water on the surface, and interposing only the remaining beads attached to the wetted surface, inside the carrying means to feed them into the pressurized steam chamber.

According to the present invention, as a carrying means, a single steam-permeable belt, such as a cloth belt, both the side edges of which can be folded back towards the longitudinal center line of the belt, so that the folded side ends can overlap one on another over the longitudinal center, can be used, where the beads are laid as a layer on the belt except both the side edge parts, and then both the side edges are folded towards the longitudinal center of the belt to envelope the beads. However, when it is desirable to produce a shaped sheet product having a width of more than 1 m, two steam-permeable belts, such as cloth belts, that is, upper and lower belts, are used as another carrying means where the upper belt and the lower belt circulate through the up-side and down-side route, respectively, of the pressurized steam chamber, but at an equal circulating speed, and the beads are interposed between the upper and lower belts placed one upon another.

When only any one of these upper and lower belts is wetted with water, the preliminarily expanded beads are attached onto the wet belt in the thickness of beads arranged in only one single layer, and the other belt having no beads thereon is placed on the belt holding the beads on its surface to interpose the beads between the belts, and the resulting shaped product will have a thickness corresponding to one single layer of the beads used.

In this manner, an expanded sheet having a weight (mass) per unit area of 20 to 40 g/m² can be obtained, though the weight per unit area is dependent upon the sizes of the preliminarily expanded beads and preliminarily expanded ratio or bulk density thereof.

When the preliminarily expanded beads are adhered onto both the opposite surfaces of the upper and lower belts, so as to have a thickness of one single layer of the beads on the respective surfaces, a shaped sheet product having the doubled thickness can be obtained.

The resulting shaped sheet product, in which the beads are closely integrated into a sheet by mutual reexpansion through the pressurized steam heating, is cooled with water, while being interposed between the belts. Therefore, the circulating belts are usually wetted with water. However, in most cases, the belts are strongly pulled against the sliding resistance in the course through the process. Consequently, when the belt is withdrawn, the belt is strongly squeezed at a portion of withdrawing pinch rollers and the water content of the belt is reduced thereby. When the preliminarily expanded beads are supplied onto the surface of such belt, the beads scarcely adhere to the belt surface, because there is too little water on the surface of the belt to keep beads adhering thereto in such a state. Unless the belt is passed again through a water tank to give a substantial water content to the belt surface, or unless water droplets are sprayed onto the belt surface to which the beads are adhered, by means of a spray, when the belts returned to the inlet-side of the pressurized steam chamber, the preliminarily expanded beads would not adhere to the belt surface stably. Especially, the latter procedure of spraying water droplets is preferable, because water content is less on the entire belt, but the beads can, however, adhere well evenly onto such belt surface.

A higher water content of the circulating belt is not advantageous, because the consumption of steam is inevitably increased, and thus the latter procedure of spraying water droplets is superior to the former procedure of passing the belts through the water tank. Since the belt is in a flat state, whereas the preliminarily expanded beads are in a spherical state, the belt is in a point contact with each of the beads, and therefore, if water droplets exist near the contact points, they catch the beads, but other excessive water droplets are permeated through the belt, and thus the beads can adhere to the belt very stably. When the beads adhere to the belt in the thickness of one single layer of the beads, the surface tension of water on the belt is not exerted upon the beads coming on the second or further layer upon the first layer of the beads, and consequently even if the beads are excessively supplied onto the water-wetted belt, all the beads on the second or further layer which are not caught by the surface tension of water are removed from the belt surface by free falling when the belt moves with an inclination of a certain angle to the level (that is, about 40° or more according to the experiences of the present inventors), or when the belt holding the preliminarily expanded beads thereon is subjected to travelling in up-side-down manner while turning over a roller.

When a weak air stream is injected from downwards onto the back-surface of the upper belt during the horizontal travelling of the water-wetted belt, the preliminarily expanded beads can adhere to the back-surface of the belt in the thickness of one single layer and the beads thus adhered never fall down, but all other excessive beads fall down. It is also effective to blow off the excessive beads by a weak air stream, because the bulk density of the preliminarily expanded beads is as small as about 0.02 to 0.03, whereas adhering power thereof due to the surface tension of water is surprisingly large. In case where the beads are arranged in the thickness of one single layer according to the process of the present invention, there are some free spaces such as openings among beads and gaps between adjoining beads, and therefore the beads in one single layer often have a 75 to 80% planely filling-up ratio, when calculated assuming that the beads themselves are laid on a horizontal level in the most closely contacted state.

Expandable polystyrene beads obtained by pearl polymerization are often classified into three or more groups by screening, depending upon the sizes of the beads, and are sold commercially after the beads have been made to absorb petroleum hydrocarbons having low boiling point. When these beads are expanded, for example, to 50 times as large as the original volume, by steam heating, the expanded beads having small diameters, i.e. 1.5 to 2.5 mm, medium diameters, i.e. 3 to 4 mm, and large diameters, i.e. 5 to 7 mm, can be obtained in the order of the classified particle sizes of the raw beads.

When the preliminarily expanded beads are interposed between the belts in the thickness of one single layer of the beads, shaped products having a smaller weight per unit area are obtained from the preliminarily expanded beads of small particle sizes, so long as the expansion ratio (bulk density) is identical.

According to another process for obtaining shaped products having a smaller weight per unit area from the preliminarily expanded beads of the same size and the same bulk density, a water-repellant finishing is applied to the belt in lateral stripes to make the beads adhere in lateral stripes only to the parts where no water-repellant is applied. In this case, a pressure sealing is possible to effect. While the preliminarily expanded beads are reexpanded in the pressurized steam chamber and moved from one roller to another through a series of rollers provided in the pressurized steam chamber while being interposed inside the carrying means, the beads are reexpanded in the forward and backward directions and at the same time, toward the left side and right side edge directions, whereby a very thin product having a smaller weight per unit area can be obtained through close integration of the beads.

Now, the present invention will be explained in detail by way of the accompanying drawings.

Figure 1A:
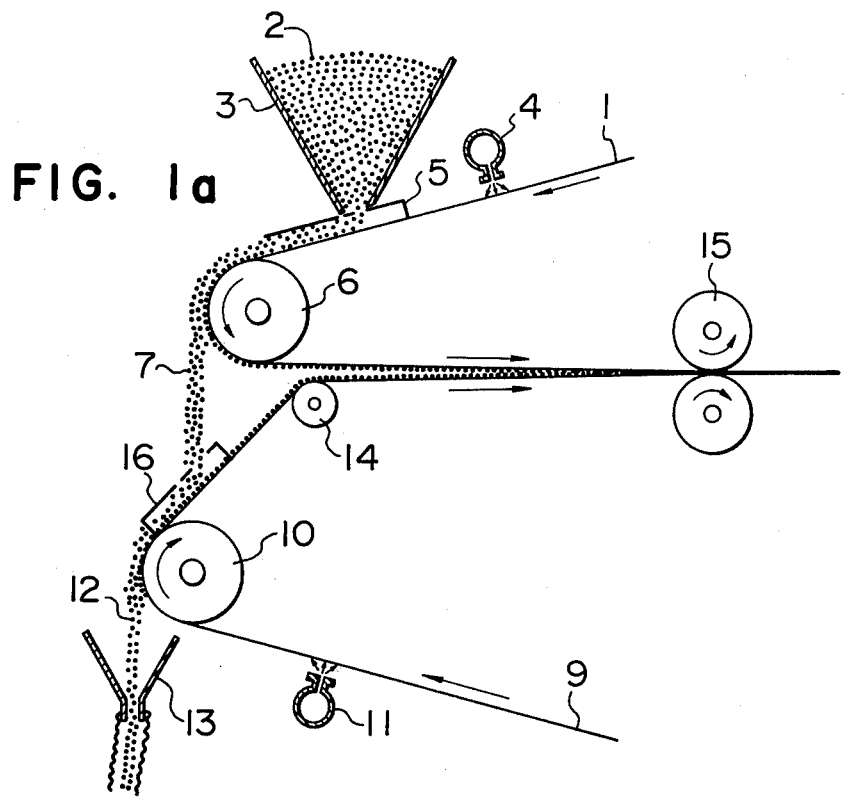
FIG. 1a is a schematic view showing that preliminarily expanded beads are supplied onto each of the opposite surfaces of a set of circulating upper and lower belts and laid thereon in the thickness of one single layer of the beads on the inlet-side of a pressurized steam chamber.
Figure 2:
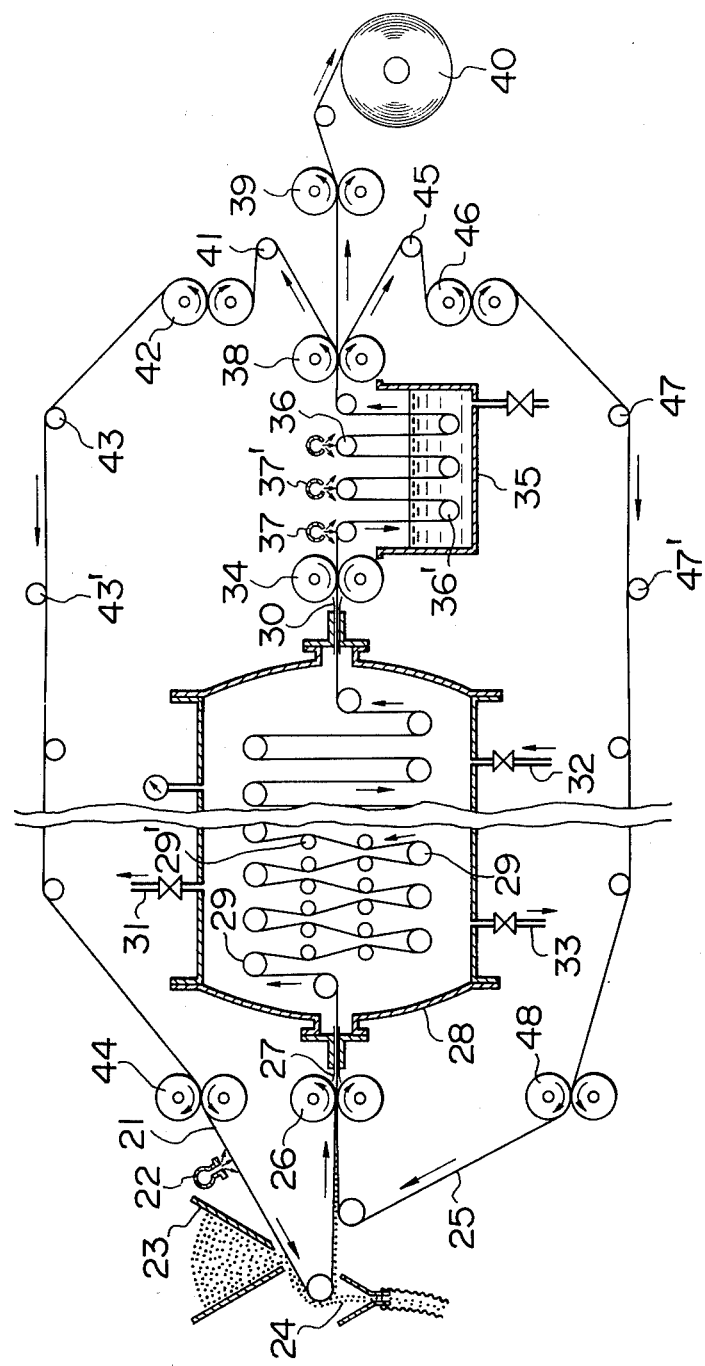
FIG. 2 is a schematic view showing a process for continuously producing a polystyrene expanded sheet product according to the method of the present invention for supplying the preliminarily expanded beads to the circulating belt.

In FIG. 1a, the preliminarily expanded beads are supplied to each of the opposite surfaces of the upper and lower belts, whereas in FIG. 2 the beads are supplied only onto the belt surface of the upper belt on the inlet-side in the continuous process for producing the shaped sheet product of expanded beads.

FIG. 1a illustrates that the preliminarily expanded beads are interposed between upper and lower circulating belts of steam-permeable cloth by placing the upper belt upon the lower belt as a carrying means. This embodiment is applicable to shaping a relatively thick sheet product having a weight per unit area of 40 to 80 g/m² by making the beads adhere onto the downside of the upper belt and also onto the upside of the lower belt respectively, in the thickness of one single layer for each of the belts. If it is desirable to shape a thin sheet product of 20 to 40 g/m², the beads are adhered onto definite one side of any one of the upper and lower sides so as to envelop only one layer of the beads therebetween as shown in FIG. 2.

Now, explanation will be made, referring to FIG. 1.

After water absorbed at the time of cooling is thoroughly squeezed from belts 1 and 9, the belts are returned from the outlet-side of a pressurized steam chamber to the inlet-side thereof. Preliminarily expanded beads 2 are supplied onto upper belt 1 from hopper 3. Just before the supply of the beads, water droplets are sprayed from sprayer 4 onto belt 1.

Figure 1B:
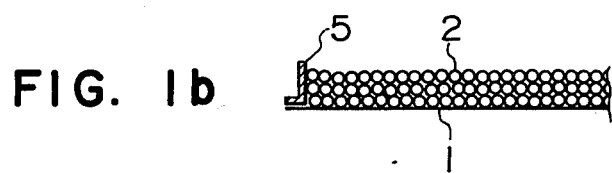
FIG. 1b is a schematic, cross-sectional view of preliminarily expanded beads oversupplied on a belt surface.
Figure 1C:
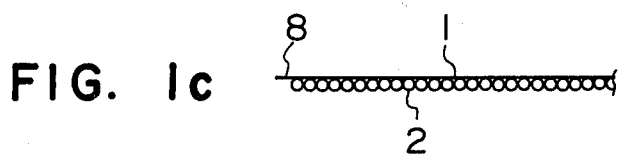
FIG. 1c is a schematic view showing such a state that the excessive beads have fallen down freely from the belt, while retaining the beads in the thickness of one single layer.

The beads are supplied to belt 1 excessively, while prevented from falling down from both the side edges of belt 1 by means of walls 5 provided at both side edges of belt 1, as shown in FIG. 1b. Then, the travelling direction of belt 1 is changed at guide roller 6, where excessively supplied beads 7 over the thickness of one single bead layer adhering directly to the wetted surface of belt 1 by the surface tension of water fall down freely, and belt 1 advances with the bead-adhering side down, as shown in FIG. 1c.

No beads adhere to both side edge parts 8 of a width, because the side parts advance under walls 5. Side edge parts 8 are then folded inwardly to protect the beads or the edges of the shaped sheet product made by close integration of the beads.

On the other hand, lower belt 9 is sprayed with water droplets from sprayer 11 from down-side just before the travelling direction of belt 9 is changed at guide roller 10, and is advanced in an upwardly inclined direction, for example, at an angle of 45° to 60°, through guide roller 10. In the course of the upwardly inclined travelling, excessively supplied beads 7 fall from upper belt 1 onto wet belt 9 running in said direction. The beads adhere to the surface of belt 9 also in the thickness of one single layer of the beads, and excessively supplied beads 12 over said one single layer further fall down from belt 9, and are collected in receiver 13. The collected beads are pneumatically returned to hopper 3, though not shown in the drawing, and reused as the raw beads.

Lower belt 9 holding the beads on its upside passes over roller 14 and arrives at pinch rollers 15, while the upper belt holding the beads on its down-side is coming to overlap upon the lower belt thereby to interpose the upper and lower layers of the beads together between the upper and lower belts. No beads adhere to the side edge parts of the lower belt, because side edge walls 16 are also provided at both the side edges of the lower belt to prevent the beads from falling down from the side edges of belt 9.

Figure 1D:
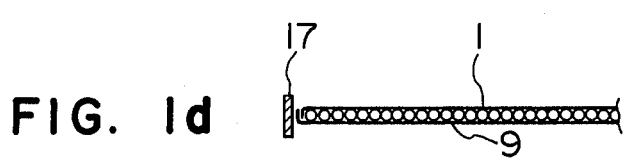
FIG. 1d is a schematic view showing side walls provided on the sides of a belt to prevent the beads from falling or protruding during the pressurized steam processing.

The side edge parts of the upper and lower belts holding no beads are folded inwardly, and their folding is kept by guide plates 17, as shown in FIG. 1d, throughout the course of the pressurized steam process to prevent the beads or shaped sheet product of expanded beads from falling off or protruding from the side edges of belts 1 and 9.

FIG. 1d shows that beads are interposed in the thickness of one single layer of the beads. In case of laying the beads in the thickness of one single layer of the beads, the beads can be laid only on one surface of any one of the upper and lower belts according to the procedure as shown in FIG. 1a.

In FIG. 2, an overall process for continuously producing a shaped expanded sheet product from the preliminarily expanded beads by pressurized steam process is illustrated. Water droplets are sprayed onto the upside of upper belt 21 on the inlet-side in the process by means of sprayer 22 to attach water droplets to the belt, and the beads supplied in excess from hopper 23 are laid on the wet surface of belt 21. The excessively supplied beads over said one single layer fall down freely into a receiver from belt 21 at a turning roller for changing the travelling direction of belt 21. Then, the beads adhering to upper belt 21 which has been turned upside down, are interposed and enveloped between upper belt 21 and lower belt 25, and then introduced into pressurized steam chamber 28 maintained at 100° C or higher in most cases under a gauge pressure of 1.0 to 1.2 kg/cm² (120°–124° C) through pinch rollers 26 and pressure sealing means 27.

In pressurized steam chamber 28, belts 21 and 25 holding beads therebetween travel together from one roller to another of a series of turning rollers 29 and 29' provided in the chamber, while changing their travelling direction at each turning roller. During that travelling from roller to roller, the beads are heated by the steam permeated through the openings of the belt. The beads are usually heated for 10 to 30 seconds, though heating depends upon the desired thickness of the shaped sheet product, and are thereby reexpanded and closely integrated into a sheet. The resulting sheet product is withdrawn from the pressurized steam chamber into the atmosphere through outlet pressure sealing means 30. Further, there is a case of using a pressure sealing means comprising a set of rollers.

The beads begin to reexpand just after the introduction into the pressurized steam chamber, and if a free reexpansion is allowed to take place, the resulting sheet product can have a bulk density of about 0.005, but there occurs no perfect free reexpansion in the chamber, because the beads are interposed between the belts under a substantial tension. However, the reexpanded beads push up the belt, and at the same time, the initial thickness of beads arranged in one single layer are sometimes locally increased to the thickness of double or more layer of the beads caused by hustling and jostling. This will cause the sheet product to have an uneven thickness. Such phenomenon is apt to occur through the initial stage heating and rapid reexpansion of the beads after the introduction into the pressurized steam chamber. To prevent any occurrence of such phenomenon, a large number of guide turning rollers 29 and 29' are provided, especially at smaller pitches between the rollers at position near to the inlet side of the chamber to repeat the more frequent changes of the travelling direction of the belts, as shown in FIG. 2. At every change of the travelling direction, the layer of the beads having some thickness is pressed down towards the center of the roller due to an excessive tension of the belt travelling on the outer side route, and the beads are prevented from increasing their thickness to said double or more layer thereby, and at the same time the spherical beads are thereby converted to flattened beads to fill up the free spaces among the beads and come to be closely integrated into a sheet having honeycomb pattern thereon. As a result, a shaped, expanded sheet product having a uniform thickness can be obtained.

In this method, the space in the pressurized steam chamber is effectively utilized and a longer belt passage can be provided even in a small pressurized steam chamber, and thus the shaping speed can be advantageously increased by providing a number of the travelling direction-changing rollers therein. To prevent the reexpanding beads or shaped sheet product from protruding from the side edges of the belts, the height of the flange at the side edge parts of the turning rollers are made higher (not shown in FIG. 2), or side walls, as shown by numeral 17 in FIG. 1d, are provided in the free passages to keep folding the side edge parts of the belts inwardly to prevent the reexpanded product from protruding from the side edges of the belts and also to form a shaped expanded sheet product of a definite width.

The pressurized steam chamber is provided with air vent pipe 31, steam feed pipe 32, and drain pipe 33, and also with a pressure gage, thermometers, a man-hole, etc.

The belts withdrawn into the atmosphere are introduced into water cooling tank 35 through pinch rollers 34, which press the belts lightly, and the shaped sheet product is cooled in a state of being enveloped with the belts in the tank with cooling water supplied from water pipes 37 and 37', while the belts travel from roller to roller of a series of rollers 36 and 36' placed in tank 35.

When the shaped product sheet is taken up from the enveloping belts just after the withdrawal from the pressurized steam chamber, the shaped sheet product readily shrinks. When the shaped sheet product is cooled in a state of being enveloped with the belts, however, the shrinkage in area of the shaped sheet product can be reduced.

After the cooling, water is squeezed from the belts through pinch rollers 38, and then the shaped sheet product is separated from the belts, and wound up onto roll 40 through pinch rollers 39. On the other hand, the upper belt from which the shaped sheet product has been peeled off is returned to the inlet side of the chamber through roller 41, drawing pinch rollers 42, and guides 43 and 43', and introduced again into the bead-feeding section through an upper returning route and pinch rollers 44. The lower belt is returned to the inlet-side of the chamber through roller 45, drawing pinch rollers 46 and guides 47 and 47', and introduced again into the feeding section through a lower returning route and pinch rollers 48.

The shaped sheet product is cooled, while being subjected to changes of the travelling direction over the rollers, and thus the shaped sheet product is suppressed in the thickness direction thereof. The resulting sheet product becomes thinner and has a bulk density of about 0.04 to 0.05. When a tension is made smaller at the rewinding after the winding-up onto the roll, and the shaped sheet product is left in a loosely wound state, the sheet absorbs air and reexpands. The bulk density of the sheet product further becomes as small as about 0.015 to 0.03. When the shaped sheet product is further passed through a steam heating chamber under the atmospheric pressure, the sheet product further expands to a bulk density of about 0.01 to 0.02. In any way, as for these shaped sheet product produced according to the present invention, the beads are thoroughly expanded at a high expansion ratio at the time of pressurized steam heating and the resulting film forming a wall of small foams is stretched to a sufficiently high ratio to have a good molecular orientation. Consequently, it is an advantage of this process that the resultant product is a soft, flexible shaped sheet, irrespective of the bulk density of the shaped sheet product depending upon the degree of pressing, and also the sheet can be readily provided with embossed patterns. That is, any desired texture pattern, or any desired marks or patterns can be embossed onto the sheet products to improve the appearance of the shaped sheet product, and at the same time the apparent thickness of the sheet can be increased by the embossing. The wadding or cushioning effect of the sheet product can be also improved thereby. The shaped sheet product of the present invention is in a good molecular orientation, and thus has such a property that the sheet product can undergo shrinkage by heating. On the basis of these properties, the present shaped sheet product can be widely utilized as a shrinkage packaging material having a good wadding effect.

To obtain a sheet product having a higher strength, non-woven fabrics of laminated warp and weft layers of split webs, threads, or stretched tapes are pasted, placed on the circulating carrying belts and adhered to the face side or back side, or both sides of the shaped sheet product, or inserted into the inside of the sheet products as an intermediate layer, to reinforce the sheet products.

As explained above, the present invention provides a method for feeding preliminarily expanded beads as raw material onto the circulating carrying means (belt or belts) when an especially thin shaped sheet product of uniform thickness is to be produced in relation to the prior invention "process for continuously producing a shaped expanded product of polystyrene" made by the present inventors.

EXAMPLE

Preliminarily expanded beads of polystyrene having an apparent bulk density of 0.02 and a diameter of 4 to 6 mm were laid onto an upper cloth belt in the thickness of one single layer of the beads, and then enveloped with the upper belt and a lower cloth belt, as shown in FIG. 2.

The enveloped beads were introduced into a steam chamber under a saturated steam gauge pressure of 1.0 kg/cm$^2$ through a pressure sealing means. In the pressurized steam chamber, a number of turning rollers, each having a diameter of 20 cm and a length of 1.2 m, were arranged, and the distance between rollers in the first one-third of the belt passage was made 25 cm, and that in the remaining two-thirds was made 100 cm. Dwelling time of the belts with beads in the chamber was made 25 seconds, and the belts were then withdrawn to the atmosphere through an outlet pressure sealing means. Then, the resulting sheet product of expanded beads together with the belts were passed through a cooling step shown in FIG. 2, and the product was wound up onto a roll, after squeezing out of water and separating from the belts whereby a soft shaped sheet product having a weight per unit area of 30 g/m$^2$ and a width of 1.2 m was obtained at a speed of 50 m/min.

The sheet product thus obtained was rewound, and passed through a steam chamber at 80° to 95° C under the atmospheric pressure, and embossed by using a roll surface having a metal net wound around its surface, whereby a soft wadding sheet product having an apparent thickness of 2.5 to 3.0 mm was obtained.

What is claimed is:

1. In the known method for continuously producing a foamed sheet of polystyrene by enclosing preliminarily expanded beads of polystyrene in a circulating steam-permeable belt means and passing the belt means through a pressurized steam-heating zone provided with pressure sealing means at both the inlet and outlet thereof, whereby the beads are cohered into an integrated sheet through softening and re-expanding of the beads by steam-heating and the resultant sheet is thereafter cooled and separated from said belt means, the improvement which comprises:
   a. wetting one surface of said circulating belt means,
   b. depositing a mass of individual preliminarily expanded beads on said wetted surface of said circulating belt means,
   c. offering the angle of inclination of said circulating belt means so that
      1. a portion of said deposited mass of individual beads will adhere directly to said wetted belt surface to form a single layer of deposited beads thereon, and
      2. the remainder of said deposited individual beads will fall off of said belt due to gravitational forces,
   d. enclosing said single layer of deposited beads within said belt means,
   e. subjecting said single layer of enclosed beads in the belt means to heat in said pressurized steam-heating zone and while doing so changing the direction of movement of said belt means a plurality of times within said steam heating zone during which time said layer of beads will be re-expanded and cohered into an integrated sheet in said steam-heating zone, the beads enclosed in said belt means being compressed in the direction of thickness of the enclosed layer of the beads due to the tension caused by the changing direction of the belt means, such tension preventing the enclosed layer of the beads from becoming unevenly thick by overlapping due to pushing up caused by hustling and jostling of said beads and permitting reexpansion of the beads only in the lateral direction thereof, and
   f. recovering a soft and flexible uniformly thin foamed sheet of polystyrene.

2. A process according to claim 1 wherein sheet of step (f) has a weight per unit area of 20 to 40 g/m².

3. In the known method for continuously producing a foamed sheet of polystyrene by enclosing preliminarily expanded beads of polystyrene in a circulating steam-permeable belt-means and passing the belt means through a pressurized steam heating zone provided with pressure sealing means at both the inlet and outlet thereof, whereby the beads are cohered into an integrated sheet through softening and re-expanding of the beads by steam heating and the resultant sheet is thereafter cooled and separated from said belt means, the improvement which comprises:
   a. wetting each surface of the upper and lower cloth belts composing the circulating belt means,
   b. depositing a mass of individual preliminarily expanded beads on each of said wetted cloth surfaces of said circulating belt means,
   c. altering the angle of inclination of each of said cloth belts of the circulating belt means so that:
      1. a portion of said deposited mass of individual beads will adhere directly to each of said wetted cloth belt surfaces to form a single layer of deposited beads on each of said surfaces, and
      2. the remainder of said deposited individual beads will fall off from said cloth belts due to gravitational forces,
   d. enclosing both of said single layers of deposited beads together within said belt means, so as to be overlapped on one another,
   e. subjecting said overlapped layers of enclosed beads in the belt means to heat in said pressurized steam-heating zone and while doing go changing the direction of movement of said belt means a plurality of times within said steam heating zone during which time said layers of beads will be re-expanded and cohered into an integrated sheet in said steam-heating zone, the beads enclosed in said belt means being compressed in the directions of thickness of the enclosed layer of the beads due to the tension caused by the changing direction of the belt means, such tension preventing the enclosed layer of the beads from becoming unevenly thick by overlapping due to pushing up caused by hustling and jostling of said beads and permitting re-expansion of the beads only in the lateral direction thereof, and
   f. recovering a soft and flexible foamed sheet of polystyrene having a uniform thickness.

* * * * *